Nov. 23, 1965  H. P. HART  3,219,916
REGULATING SYSTEM WITH SATURATING REACTOR
Filed July 2, 1962
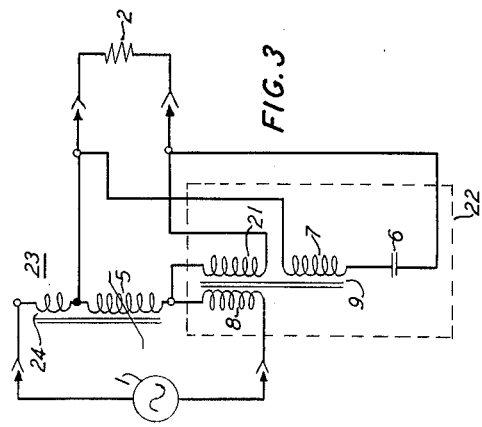
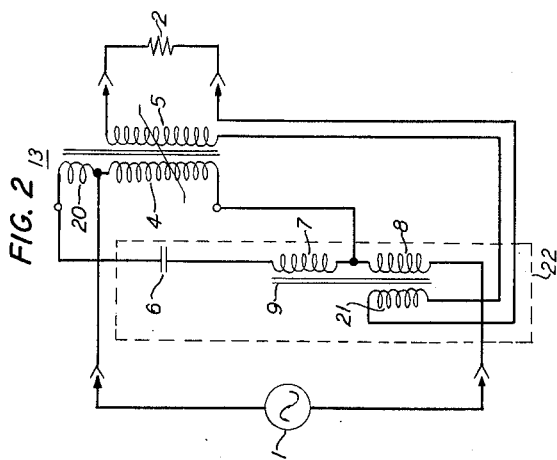
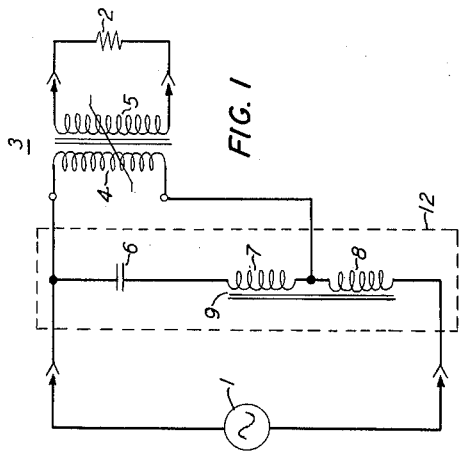
INVENTOR
H. P. HART
BY
ATTORNEY 3,219,916
REGULATING SYSTEM WITH
SATURATING REACTOR
Harry P. Hart, Whippany, N.J., assignor to Bell Telephone Laboratories, Incorporated, New York, N.Y., a corporation of New York
Filed July 2, 1962, Ser. No. 206,953
3 Claims. (Cl. 323—76)

This invention relates to alternating-current voltage regulating systems using saturating reactors and more particularly to ferroresonant regulators with low harmonic distortion.

Two persistent problems of such regulating systems are the need to achieve adequate power transfer from input to load and the need to eliminate the odd harmonics generated by the nonlinear operation of the saturating reactor. One type of solution found in the prior art provides a tuned circuit which has more than two terminals. The tuned circuit may be caused to resonate at a first pair of these terminals at or near the fundamental frequency of the input voltage source in order to provide an input impedance of the regulating circuit which matches the impedance of the input voltage source and facilitates power transfer from that source. Simultaneously, the tuned circuit may be caused to resonate at a second pair of its terminals at or near a harmonic frequency generated by the saturating inductance in order to damp out that harmonic of the fundamental input frequency.

Such tuning circuit arrangements can account for a substantial part of the cost, bulk and weight of a voltage regulating system using a saturating reactor.

It is an object of this invention to reduce the size, weight and cost of a regulating circuit which includes a saturating inductance and a tuning circuit which simultaneously damps out harmonics and maintains an input impedance match.

Accordingly, applicant has recognized that the components of such a tuned circuit may be electromagnetically coupled together in a novel manner to achieve voltage levels on various components of the tuned circuit and on the saturating inductance which allow reductions in the size, weight and cost of some components of the regulating circuit and of the circuit itself.

In particular, the tuned circuit for damping out harmonics and maintaining an input impedance match includes two linear, or nonsaturating, inductances which are connected in different relationships to the two pairs of terminals. According to the principal feature of the invention, additive magnetic coupling between the two linear inductances for the fundamental frequency currents flowing through them makes it possible to increase the fundamental frequency voltage variations on one of them, in comparison to its fundamental frequency voltage variations in the absence of magnetic coupling, while still maintaining the input impedance match and damping out harmonics. The size, weight and cost of certain other components of the regulating circuit, such as the saturating inductance, may be correspondingly reduced.

Other features and advantages of the invention will become apparent from the following detailed description and from the drawings, in which:

FIG. 1 is a schematic diagram of a preferred embodiment of the invention;

FIG. 2 is a schematic diagram of a modification of the embodiment of FIG. 1; and FIG. 3 is a schematic diagram of another modification of the embodiment of FIG. 1.

A voltage regulating system utilizing the principles of the invention is shown in FIG. 1. The object of the regulating system is to supply a sinusoidal alternating-current voltage of a fundamental frequency to load 2 with no substantial noncyclical fluctuations in voltage magnitude. The principal voltage regulating properties of the circuit of FIG. 1 are attributable to saturating inductance 3, which is a reactive device with nonlinear characteristics. Specifically, it is an inductive device with a magnetic characteristic with sharply defined saturation points. An inductor with this type of characteristic in combination with a capacitor is useful in producing the phenomenon of ferroresonance; consequently, a voltage regulator using such an inductor is frequently called a ferroresonant regulator. The specific term "saturating" is applied to saturating inductance 3 because it is used without independent control means, such as variable direct-current biasing.

Secondary winding 5 of saturating inductance 3 is connected in a closed loop with load 2. Primary winding 4 of saturating inductance 3 is connected to a tuned circuit 12. As viewed from winding 4, tuned circuit 12 is designed to damp out harmonics generated by the highly nonlinear nature of saturating inductance 3. Within tuned circuit 12, capacitor 6 and linear, or nonsaturating, inductance 7 are connected in a closed loop with winding 4 of saturating inductance 3. Linear, or nonsaturating inductance 8 and input voltage source 1 are also connected in a closed loop with winding 4 of saturating inductance 3.

A number of desirable operations are performed simultaneously by the embodiment of the invention shown in FIG. 1 with a small number of relatively small, lightweight components and with marked structural simplicity and relatively low cost. Thus, tuned circuit 12 as viewed from input 1 matches the relatively low impedance of input 1 in order to facilitate power transfer from input 1 to load 2. At the same time, tuned circuit 12 responds to alternating-current voltages of winding 4 by resonating at or near some harmonic frequency generated by saturating inductance 3 and therefore attenuates the amount of that harmonic which appears across load 2. So far, these functions may be found in the prior art.

According to the principal feature of the invention, voltage levels within tuned circuit 12 are determined by magnetic coupling between windings 7 and 8, while tuned circuit 12 still matches the impedance of input 1 and damps out the harmonics of saturating inductance 3. Linear inductive winding 8 is wound upon the same core 9 with linear inductive winding 7 and oriented so that the fundamental frequency voltage which is induced in winding 7 from winding 8 is in phase with and additive with the fundamental frequency voltage which would exist in winding 7 if there were no magnetic coupling between windings 7 and 8. The core 9 may be a toroidal core with an air gap such that a desired coefficient of coupling between windings 7 and 8 may be obtained. It will be noted that no electromagnetic field coupling is needed or desired between tuned circuit 12 and the saturating inductance 3.

The additive magnetic coupling raises the peak voltage on winding 7 and on capacitance 6 above the voltage which would be obtained on capacitance 6 if the same tuning conditions as set out above were satisfied, but without magnetic coupling between windings 7 and 8. Since the load handling capacity of a ferroresonant regulator is known to be proportional to $CE^2$, where C is the capacitance of capacitor 6 and E is the voltage across it, the magnetic coupling between windings 7 and 8 means that the load rating of the circuit of FIG. 1 can be greater than that possible without the magnetic coupling, or alternatively, the size of capacitor 6 may be reduced for a given load 2 as compared to the size required without the magnetic coupling between windings 7 and 8.

Reducing size of capacitor 6 gives a distinct advantage from the viewpoint of circuit size and cost. This result has heretofore been achieved by increasing the size, weight and cost of saturating inductance 3. In contrast, the invention utilizes components which are already in the circuit for other purposes to achieve the same result with relatively little increase in the size, weight and cost of any components and without the necessity of any increase in the size, weight or cost of saturating inductance 3.

The operation of the embodiment of the invention shown in FIG. 1 may be more particularly explained as follows. The basic mechanism by which voltage regulation is obtained is that a definite time integral of voltage across winding 5 of saturating inductance 3 is required in order to swing the flux of saturating inductance 3 from one saturation level to the other. Since only one such swing of the flux in saturating inductance 3 can occur for each half cycle of the input voltage from source 1, the half-cyclic average voltage across load 2 is equal to that definite time integral of voltage for winding 5 divided by the half period of the input voltage. Thus, the half-cyclic average voltage across load 2 is held constant.

In the prior art, the cooperation of capacitor 6 with saturating inductance 3 has been explained in various manners but perhaps one of the most satisfactory is that capacitor 6 additionally provides peak-to-peak regulation and root-mean-square regulation of the voltage across load 2. Since saturating inductance 3 merely holds constant the half-cyclic average value of the voltage across load 2, voltage peaks may be simultaneously very tall and very narrow, or simultaneously very short and very fat, without disturbing the half-cyclic average value. The introduction of capacitor 6 produces an improved proportioning between the height of a voltage peak and its width at any given point below that peak, as capacitor 6 charges and discharges in response to voltage changes across winding 4 of saturating inductance 3. This proportioning effect combined with half-cyclic average voltage regulation results in peak-to-peak voltage regulation and root-mean-square voltage regulation. A like proportioning effect is still obtained when linear inductance 7 with its mutual inductive coupling with linear inductance 8 is introduced in the charging and discharging path of capacitor 6. Linear inductance 7 then participates with capacitor 6 in the wave shaping of the output voltage.

Linear inductance, such as that possessed by the combination of windings 7 and 8 in the circuit of FIG. 1, cooperates with capacitor 6 to match the impedance seen by input 1 to the impedance of input 1 itself in order to obtain maximum power transfer from input 1. The impedance match is determined with saturating inductance 3 unsaturated and presenting a very high impedance. The matching condition usually corresponds to series resonance of tuning circuit 12 at the fundamental input frequency at input 1, since input 1 usually has a very low impedance. The harmonic damping function of the invention is obtainable simultaneously with the impedance matching at the input 1 because tuning circuit 12, as viewed from winding 4, can be tuned to a higher frequency than the fundamental input frequency. It should be noted that since input 1 has a very low impedance, it may be assumed to be a short circuit in calculating the tuning of tuning circuit 12 for harmonic damping.

It has been experimentally determined that good elimination of harmonics is obtained when tuning circuit 12 is adjusted so that the impedance seen from winding 4 is resonant at the third harmonic or fifth harmonic of the fundamental frequency of input 1. It has further been experimentally determined that by making the impedance seen from winding 4 resonant at the fourth harmonic frequency both the third and fifth harmonics are substantially attenuated. This is a result of substantial importance because the third and fifth harmonics are the predominant harmonics generated by saturating inductance 3.

While simultaneously satisfying both tuning conditions discussed above, the magnetic coupling between windings 7 and 8 may be adjusted to produce a desired level of peak-to-peak voltage on capacitor 6. Thus, it is no longer necessary to resort to the prior art scheme for increasing the voltage on capacitor 6, which would involve using the saturating inductance 3 as an autotransformer to step up the voltage on capacitor 6. At the very least, the magnetic coupling between windings 7 and 8 reduces the size, weight and cost of saturating inductance 3 which would be necessary in order to use a given size of capacitance 6 for a given load 2. This achievement will be more fully explained in connection with FIG. 2.

It further has been determined that to attain proper conditions for tuning, the coefficient of coupling between windings 7 and 8 on core 9 should be less than a critical value, $K_c$, where $$K_c = \sqrt{1 - \frac{1}{H^2}}$$

$$H = \frac{\text{harmonic frequency}}{\text{source frequency}}$$

The "harmonic" frequency referred to above is the frequency at which winding 4 is desired to be shunted by a low impedance resonant circuit. For example, assume that the impedance seen from winding 4 looking toward input 1 is desired to be resonant at the third harmonic of the fundamental frequency of input 1. Then $H=3$, and $$K_c = \frac{2}{3}\sqrt{2}$$

or approximately 0.94. This means that the coefficient of coupling between windings 7 and 8 must be kept below 0.94 if both of the desired tuning conditions are to be obtained. On the other hand, a fairly high coefficient of coupling is desired in order to produce as great a voltage swing on capacitor 6 as possible. It has been experimentally determined that a coefficient of coupling of 0.8 may readily be obtained and that it allows reasonable values of the components of tuning circuit 12 to satisfy the desired tuning conditions for operation with a sixty-cycle-per-second source and raises the voltage swing on capacitor C appreciably.

Various modifications of the embodiment of the invention shown in FIG. 1 can be made. For instance, the voltage on capacitor 6 can be still further increased by using an additional winding on saturating inductance 3, in the prior art autotransformer fashion. This is illustrated by winding 20 on saturating inductance 13 in FIG. 2. The use of magnetic coupling between linear inductances 7 and 8, according to the invention, allows winding 20 to be a smaller winding than would otherwise be necessary to obtain a given voltage level on capacitor 6.

A further modification of the embodiment of FIG. 1 is carried out in FIG. 2 by compensating the voltage across load 2 for changes in voltage resulting from changes in load current, to the extent that these voltage changes are not eliminated by saturating inductance 13. A compensating winding 21 is introduced on core 9 for this purpose. The sort of compensation provided by winding 21 is generally called compounding and its techniques are familiar in the electrical machinery art.

The modifications incorporated into FIG. 2 are specifically provided as follows. Winding 20 of saturating inductance 13 is connected with winding 4 of saturating inductance 13 and is additively magnetically coupled with winding 4. Capacitor 6 and linear inductance 7 are connected in a closed loop with windings 4 and 20 through the noncommon terminals of windings 4 and 20.

Linear inductive winding 8 is connected in a closed loop with input 1 and winding 4 of saturating inductance 13. Winding 21 is connected in a closed loop with load 2 and output winding 5 of saturating inductance 13 and is oriented so that the voltage induced in it from winding 8 as the current of load 2 increases is additive with the voltage across winding 5.

Winding 21 may be neglected in the calculations of the tuning of tuning circuit 22 to match the impedance of input 1 and to provide a harmonic-damping impedance across windings 4 and 20 because it has no substantial effect on the tuning conditions.

Except for the voltage compensating effect of winding 21 and the increased voltage swing on capacitor 6 produced by winding 20 of saturating inductance 13, the modified embodiment of FIG. 2 operates in the same fashion as the embodiment of FIG. 1. It may be noted that if the coefficient of magnetic coupling between windings 7 and 8 is increased, the size of winding 20 may be reduced, as the load rating of the circuit of FIG. 2 is held constant.

A further modification of the embodiment of FIG. 1 may be made by connecting capacitor 6 and linear inductance winding 7 across load 2. This is illustrated in the modification of the embodiment of FIG. 1 shown in FIG. 3. Specifically, linear inductance 7 and capacitance 6 of tuning circuit 22 are connected in a closed loop with winding 5 of saturating inductance 23. That closed loop may also include winding 21 but does not include load 2, which is connected in another closed loop with winding 5 of saturating inductance 23 and linear compensating winding 21, as taught in FIG. 2.

Another modification of the embodiment of FIG. 1 may be made by using a purely autotransformer connection of the saturating inductance, as illustrated by saturating inductance 23 of FIG. 3. Winding 24 of saturating inductance 23 is connected to output winding 5 of saturating inductance 23; and input 1 and linear inductance 8 are connected in a closed loop with windings 24 and 5 through the noncommon terminals of windings 24 and 5.

The operation of the magnetic coupling between linear inductive windings 7 and 8 of tuning circuit 22 remains the same as described above for tuning circuit 12 of FIG. 1. The adjustment of tuning circuit 22 should provide an impedance match for input 1 and should provide a low impedance for harmonics of the fundamental input frequency generated by saturating inductance 23. By tuning the impedance of tuning circuit 22, as seen from winding 5, to resonance at the fourth harmonic, the magnitudes of both the third and fifth harmonics across load 2 may be substantially attenuated.

Thus, it is seen that the invention turns centrally upon the magnetic coupling between the linear, or non-saturating, inductive windings 7 and 8 of FIGS. 1, 2, and 3. That coupling can allow appreciable reductions in the sizes, weights and costs of the capacitor 6 and the saturating inductance 3 (or 13 or 23) otherwise necessary for a given load rating of the regulator circuit; and structural simplicity is maintained because proper tuning conditions to match impedance of input 1 and eliminate harmonics can be obtained without magnetic coupling between saturating inductance 3 (or 13 or 23) and the linear inductances on core 9.

In all cases, it is understood that the above-described arrangements are illustrative of a small number of the many possible specific embodiments which can represent applications of the principles of the invention. Numerous and varied other arrangements can readily be devised in accordance with those principles by those skilled in the art without departing from the spirit and scope of the invention.

What is claimed is:

1. A voltage regulator circuit of the type comprising an input to which a voltage of fundamental frequency may be applied, an output, a saturating inductor coupled across said output, a first linear inductor coupled serially with said saturating inductor across said input, a second linear inductor and a capacitor coupled serially across said saturating inductor, said second linear inductor and said capacitor being tuned across said saturating inductor to a second frequency at least as high as the third harmonic of said fundamental frequency, said circuit being particularly characterized by magnetic coupling between said second linear inductor and said first linear inductor in a polarity to step up the voltage amplitude across said capacitor at said fundamental frequency, said tuning of said second linear inductor and said capacitor to said second frequency being determined as affected by said first linear inductor.

2. A voltage regulator circuit of the type comprising an input to which a voltage of fundamental frequency may be applied, an output, a saturating inductor having first and second portions, a first linear inductor connected serially with said first portion across said input, said second portion being connected across said output, a second linear inductor and a capacitor connected serially across said first portion, said second linear inductor and said capacitor being tuned across said first portion to a second frequency at least as high as the third harmonic of said fundamental frequency, said circuit being particularly characterized by magnetic coupling between said second linear inductor and said first linear inductor in a polarity to step up the voltage amplitude across said capacitor at said fundamental frequency, said tuning of said second linear inductor and said capacitor to said second frequency being determined as affected by said first linear inductor.

3. A voltage regulator circuit of the type comprising an input to which a voltage of fundamental frequency may be applied, an output, a saturating inductor having first and second portions, a first linear inductor connected serially with said first portion across said input, said second portion being connected across said output, a second linear inductor and a capacitor connected serially across said second portion, said second linear inductor and said capacitor being tuned across said second portion to a second frequency at least as high as the third harmonic of said fundamental frequency, said circuit being particularly characterized by magnetic coupling between said second linear inductor and said first linear inductor in a polarity to step up the voltage amplitude across said capacitor at said fundamental frequency, said tuning of said second linear inductor and said capacitor to said second frequency being determined as affected by said first linear inductor.

References Cited by the Examiner

UNITED STATES PATENTS 2,442,214   5/1948   Short _____ 323—76

LLOYD McCOLLUM, *Primary Examiner.*